(12) United States Patent
Tigerghien et al.

(10) Patent No.: US 7,987,870 B2
(45) Date of Patent: Aug. 2, 2011

(54) OVERPRESSURE PROTECTION DEVICE AND CONNECTION SUBASSEMBLY COMPRISING SAME

(75) Inventors: Alain-Christophe Tigerghien, Sevrier (FR); Andre Charles Pavan, Faverges (FR)

(73) Assignee: Staubli Faverges, Faverges (FR)

( * ) Notice: Subject to any disclaimer, the term of this patent is extended or adjusted under 35 U.S.C. 154(b) by 668 days.

(21) Appl. No.: 11/886,314

(22) PCT Filed: Mar. 24, 2006

(86) PCT No.: PCT/FR2006/000656
§ 371 (c)(1),
(2), (4) Date: Sep. 14, 2007

(87) PCT Pub. No.: WO2006/100396
PCT Pub. Date: Sep. 28, 2006

(65) Prior Publication Data
US 2008/0190491 A1    Aug. 14, 2008

(30) Foreign Application Priority Data

Mar. 25, 2005 (FR) .................................... 05 02990

(51) Int. Cl.
*F16K 17/00* (2006.01)
(52) U.S. Cl. ......................................... 137/460; 137/463

(58) Field of Classification Search ............... 137/461, 137/463, 614.11, 460, 462; 429/25
See application file for complete search history.

(56) References Cited

U.S. PATENT DOCUMENTS

| 3,228,417 | A | | 1/1966 | Schwerter | |
| 3,384,110 | A | * | 5/1968 | Wiley | 137/458 |
| 3,424,194 | A | | 1/1969 | Kruzan et al. | |
| 3,589,398 | A | * | 6/1971 | Haach | 137/614.19 |
| 3,842,858 | A | * | 10/1974 | Bobo | 137/458 |
| 4,067,359 | A | * | 1/1978 | Kwast | 137/630.14 |
| 4,223,692 | A | * | 9/1980 | Perry | 137/78.4 |
| 4,976,281 | A | * | 12/1990 | Berglund | 137/460 |
| 6,635,372 | B2 | * | 10/2003 | Gittleman | 429/17 |
| 2002/0164545 | A1 | * | 11/2002 | Sakaguchi et al. | 430/314 |

* cited by examiner

*Primary Examiner* — Stephen N Hepperle
*Assistant Examiner* — Macade Brown
(74) *Attorney, Agent, or Firm* — Dowell & Dowell, P.C.

(57) ABSTRACT

The invention relates to a protection device which defines a through hole (21) for the passage of a fluid which may be under overpressure conditions. In addition, the inventive device comprises: a stop plug (26) which can move between an open position and a position in which a first section of the hole (21) is sealed; a stop valve (28) which can move between an open position and a position in which a second section of the hole (21) is sealed; and means (22, 23, 27) for triggering both the movement of the stop plug (26) and the movement of the valve (28) from the open position to the sealing position in response to an overpressure ($P_2$) in the hole (21). The invention is particularly suitable for self-contained equipment used to supply electrical power by means of a fuel cell.

14 Claims, 3 Drawing Sheets

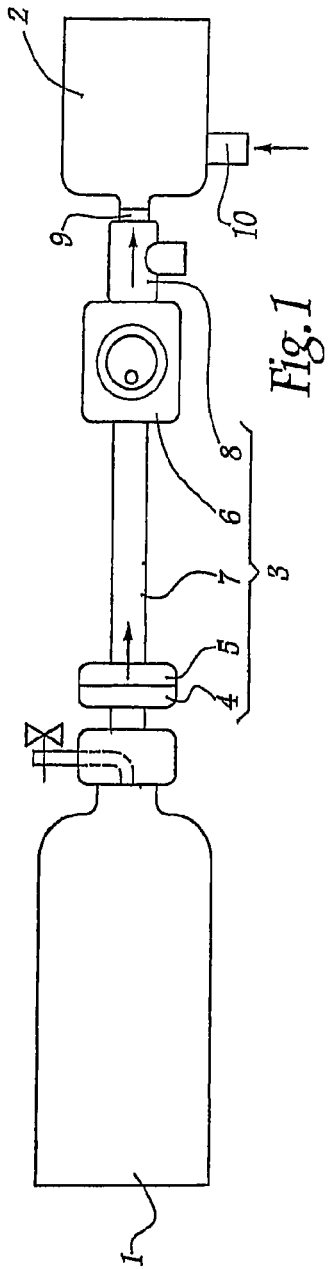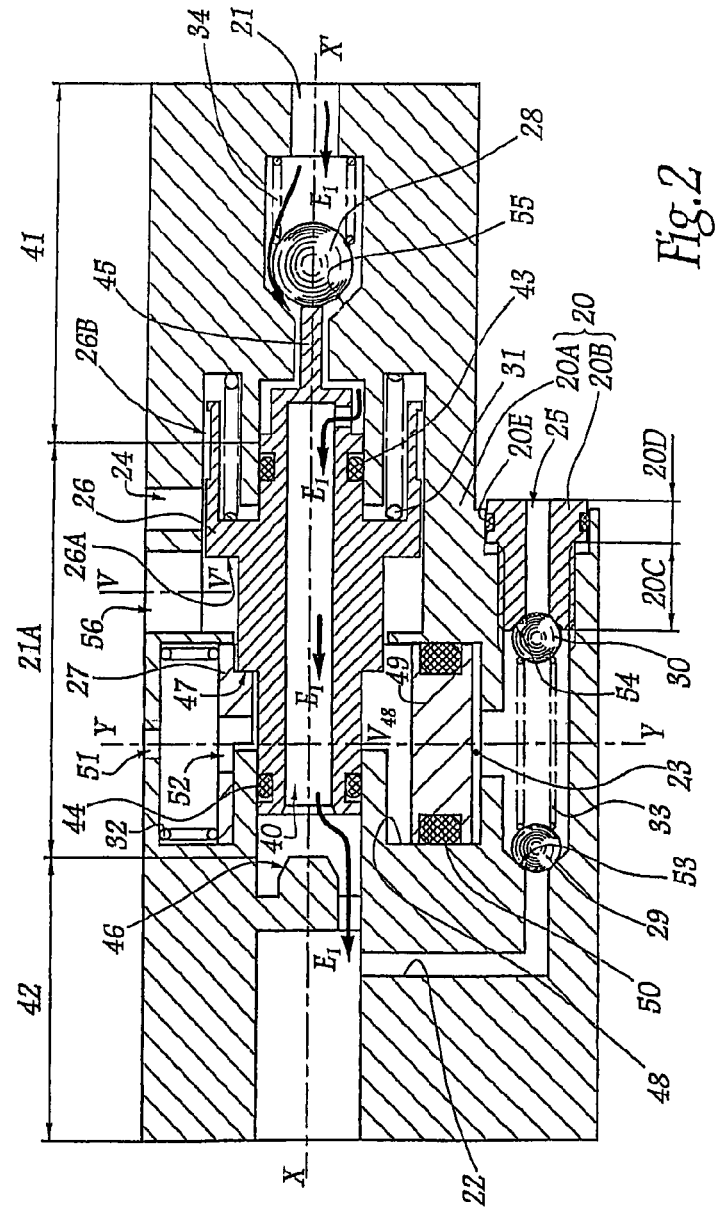

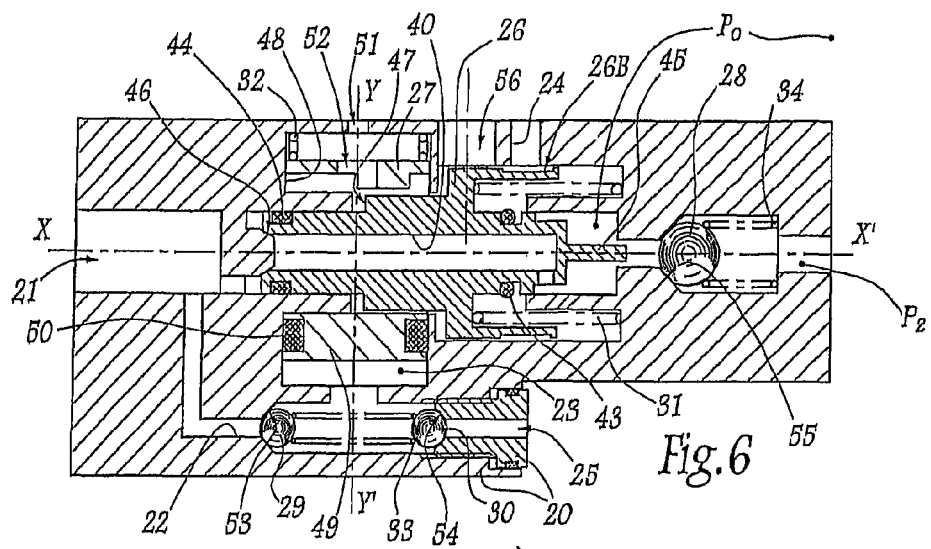
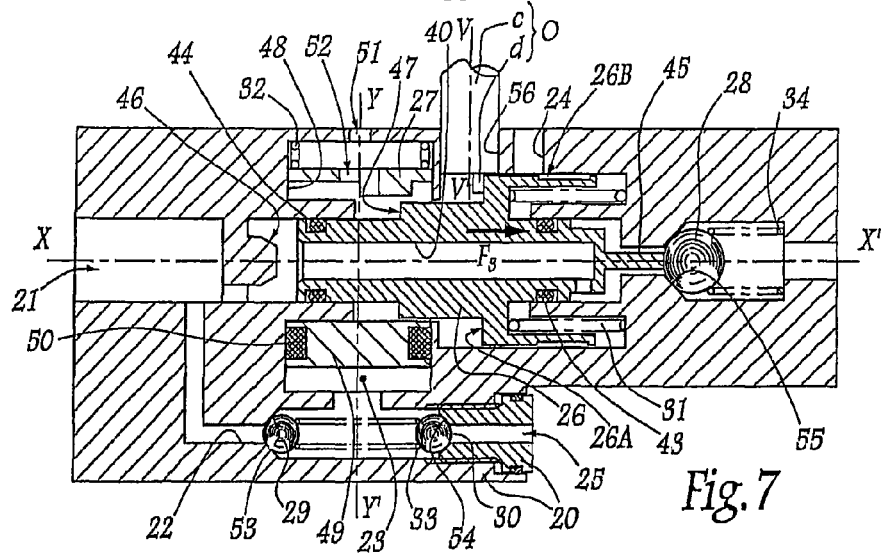
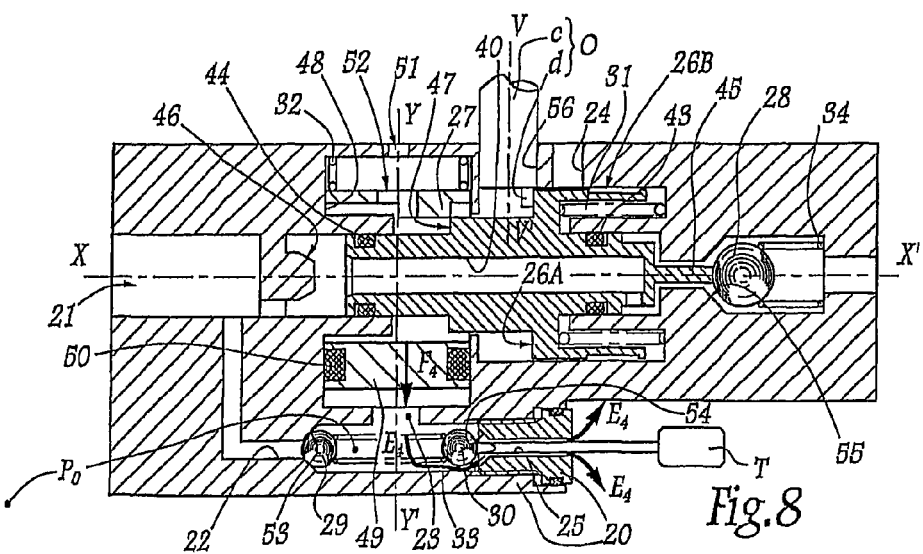

OVERPRESSURE PROTECTION DEVICE AND CONNECTION SUBASSEMBLY COMPRISING SAME

BACKGROUND OF THE INVENTION

1. Field of the Invention

The present invention relates to a protection device for protecting apparatus against overpressure in a fluid feeding the apparatus. The invention also relates to a subassembly including said protection device and enabling a tank for storing hydrogen under pressure to be coupled to a fuel cell forming part of self-contained equipment for supplying electricity.

2. Description of the Related Art

Fuel cells producing electricity from hydrogen and oxygen can take oxygen from the air of the atmosphere, for example. The hydrogen fed to the fuel cell must come from a source or from a storage tank, from which it is conveyed by a delivery duct. If overpressure should occur in the hydrogen in the delivery duct, then there is a risk of damaging the fuel cell, unless an overpressure protection device has been provided upstream from the cell.

U.S. Pat. Nos. 3,424,194 and 3,228,417 disclose associating a pressure regulator with a protection device for providing protection against overpressure at the outlet from the regulator. In those systems, the pressure regulator is provided with a first shutter connected to a first diaphragm, while the protection device is provided with a second shutter connected to a second diaphragm. If overpressure occurs, each of the diaphragms is driven and acts via connection elements to displace each of the shutters towards a position for shutting a through hole. In those systems, two distinct equipment series act respectively on the first shutter and on the second shutter in order to cause them to move towards their respective shut positions, which limits the reactivity of the system against overpressure. Furthermore, such systems are bulky and heavy, which constitutes a drawback when the apparatus that is to be protected against overpressure forms part of equipment that is self-contained and portable.

SUMMARY OF THE INVENTION

The invention seeks more particularly to remedy those drawbacks by proposing a protection device for protecting apparatus against overpressure in a fluid feeding said apparatus, which device provides the apparatus with protection against overpressure that is effective and reliable, with good reactivity and while occupying little space.

To this end, the invention provides a protection device for protecting apparatus against overpressure in a fluid feeding the apparatus, the protection device defining a through hole for passing the fluid and including a shutter movable between an open position and a position for shutting a first segment of the hole, the device being characterized in that it includes a shutter valve member movable between an open position and a position for shutting a second segment of the hole, together with trigger means suitable for triggering both drive of the shutter and drive of the valve member from their open positions towards their shut positions in response to overpressure in the hole.

According to other characteristics of the protection device, that are advantageous:

the trigger means comprise a latch mounted slidably in a bore so as to be movable between a first position in which the latch retains the shutter in its open position, and a second position in which the latch does not oppose the shutter moving from its open position towards its shut position;

it includes a resilient member for returning the latch towards its first position;

the shutter is a slidably-mounted slide, the latch and the shutter sliding respectively in a first direction and in a second direction, which directions intersect and are perpendicular;

the latch separates first and second zones of the bore from each other, and is movable from its first position towards its second position as a function of the pressure that exists in the first zone that is connected to said hole via at least one connection passage;

the latch cannot be moved from its second position towards its first position until after the first zone of the bore has been purged;

when the shutter is in its open position, but not when the shutter is in its shut position, the shutter retains the valve member in its open position;

the valve member is upstream from the shutter which is slidably mounted to pass from its shut position to its open position while moving towards said valve member and then while pushing said valve member towards its open position;

it includes a bleed passage for purging at least an intermediate segment of the hole when the valve member is in its shut position, but not when the valve member is in its open position, the intermediate segment being located downstream from the valve member;

the shutter is downstream from the valve member and is adapted to open the bleed passage before reaching its shut position;

it includes a connection passage connecting the hole with a chamber defined in part by a member forming part of said trigger means, said connection passage including a second shutter valve member and a resilient member for returning said second valve member upstream towards a position for shutting the connection passage, said resilient return member being calibrated in such a manner as to allow the second valve member to be driven by pressure upstream from the second valve member when said pressure exceeds the pressure downstream from the second valve member by a predetermined quantity;

the chamber is leaktight, the protection device including means for purging said chamber;

it includes means for calibrating the magnitude of the return force exerted by the resilient member on the second valve member;

it includes a state indicator making it possible from outside the body of the device to detect the positions of the shutter and of the valve member; and said protection device is fitted with one of two complementary male and female portions of a quick coupling so as to enable the hole to be coupled to the other portion of the coupling.

The invention also provides a subassembly for coupling a tank for storing hydrogen under pressure to a fuel cell of self-contained equipment for supplying electricity, with the subassembly forming part of said equipment, the subassembly comprising at least one expander for expanding hydrogen under pressure, and a protection device as defined above and placed downstream from the expander so as to be capable of protecting the fuel cell against overpressure of the hydrogen reaching said fuel cell.

BRIEF DESCRIPTION OF THE DRAWINGS

The invention can be well understood on reading the following description given purely by way of example and made with reference to the accompanying drawings, in which:

FIG. 1 is a diagrammatic view of self-contained and portable equipment for supplying electricity from hydrogen stored under pressure in a tank and from atmospheric oxygen, with the help of a fuel cell that a subassembly in accordance with the invention connects to the tank;

FIG. 2 is a diagrammatic axial section of a protection device that is in accordance with the invention, that forms part of the coupling subassembly shown in FIG. 1, and that can serve to protect the fuel cell from overpressure in the duct for delivering hydrogen to the cell; and FIGS. 3 to 8 are sections analogous to FIG. 2, but on a smaller scale, and showing the operation of the protection device shown in FIG. 2 in the event of overpressure occurring.

DETAILED DESCRIPTION OF THE PREFERRED EMBODIMENTS

Figure 3:
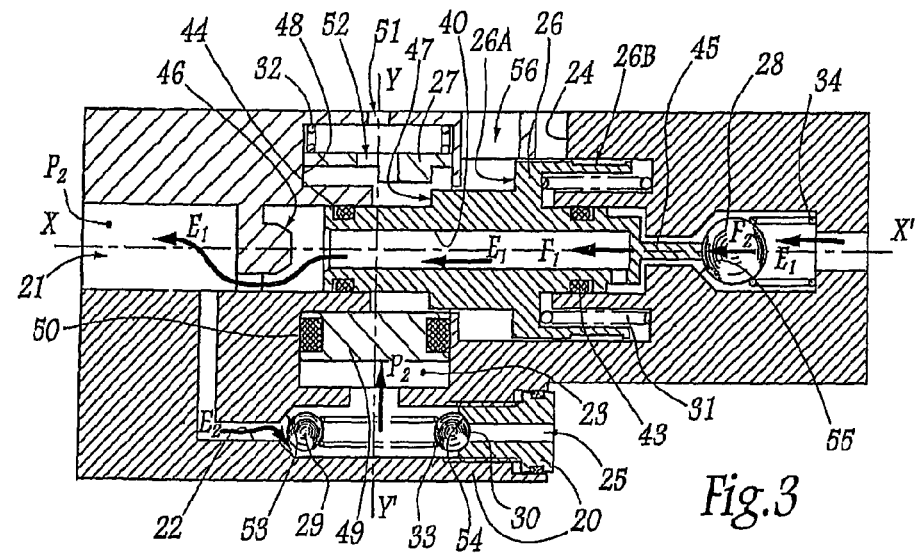

FIG. 1 shows self-contained and portable equipment for supplying electricity from hydrogen and oxygen. The hydrogen that is consumed comes from a tank 1 in which it is stored under very high pressure, e.g. at a pressure of the order of 700 bars.

In addition to the tank 1, the equipment shown in FIG. 1, comprises a fuel cell 2 that operates in known manner, and a subassembly 3 that connects it to the tank 1. The subassembly 3 comprises two expanders 4 and 5 in series, together with a protection device 6 for protecting the cell 2 in the event of overpressure occurring downstream from the expanders. By way of example, such overpressure might result from one of the expanders 4 and 5 malfunctioning, which expanders serve to deliver hydrogen at a pressure of a few bars, e.g. at a pressure of the order of 4 bars. The device 6 is thus installed downstream from the expanders 4 and 5, to which it is connected by a duct 7 of the subassembly 3.

The subassembly also has a male or female portion 8 of a conventional quick coupling enabling the subassembly 3 and the cell 2 to be connected together and to be separated quickly. This coupling portion 8 is fitted to the protection device 6. The other portion 9 of the quick coupling is fitted to the cell 2, which is also provided with an intake 10 for atmospheric air. This intake 10 serves to take in atmospheric air, and the cell 2 can subsequently make use of the oxygen therein in order to produce electricity.

The protection device 6 is shown on its own in FIGS. 2 to 8. It comprises a body 20 that defines a through hole 21, a connection passage 22, a variable-volume chamber 23, a segment 24 of a first bleed passage, and a second bleed passage 25. Furthermore, the body 20 contains a shutter 26, a latch 27 for holding the shutter in the open position, a shutter valve member 28 for shutting the hole 21, a shutter valve member 29 for shutting the connection passage 22, a shutter valve member 30 for shutting the bleed passage 25, and four resilient return members constituted by springs 31 to 34.

FIGS. 2 to 8 are diagrammatic, in particular in that, for reasons of clarity, a portion 20A of the body 20 is shown therein as being a single part, whereas in reality it is the result of assembling a plurality of parts, some of which are not united until after the members contained inside the body 20 have been put into place. Another portion 20B of the body 20 is in the form of a hollow screw, having its threaded shank 20C screwed into a tapped hole in the portion 20A and defining part of the variable-volume chamber 23. This portion 20B has a head 20D that extends the shank 20C. An O-ring 20E contributes to sealing the chamber 23 by being compressed between the portions 20A and 20B of the body 20, in a groove formed in the periphery of the head 20D.

The inlet and the outlet of the hole 21 are designed to be connected respectively to the duct 7 and to the coupling portion 8. In other words, the hole 21 is designed to pass the hydrogen going from the expanders 4 and 5 towards the cell 2. Below, and in the accompanying claims, the terms "upstream" and "downstream", and analogous terms, refer to the direction in which hydrogen flows from the tank 1, and in particular through the body 20.

Advantageously, the shutter 26 is in the form of a slide that is slidably mounted in the hole 21 so as to be movable along the longitudinal direction X-X' of the hole 21. The shutter is pierced by a central longitudinal duct 40 that connects an upstream segment 41 of the hole 21 to a downstream segment 42 of the same hole 21. Between the segments 41 and 42, the hole 21 has an intermediate segment 21A that can be put into communication with the outside via the segment 24 and a hole 56. More precisely, the hole 56 is a bore in the form of a circular cylinder of axis V-V'.

The shutter 26 is provided with two sealing rings 43 and 44. The ring 43, i.e. the upstream ring, serves to provide sealing between the wall of the intermediate segment 21A and the shutter 26 when the shutter is in its open position, i.e. as shown in FIG. 2. The ring 44 also serves to provide sealing between the wall of the intermediate segment 21A and the shutter 26, but downstream from the ring 43.

The upstream end of the shutter 26 is in the form of a finger 45 for driving the valve member 28 in the upstream direction, and then for holding said valve member 28 in its open position. The valve member 28 is constituted by a ball. The spring 31, which is then compressed, urges the shutter 26 downstream towards a frustoconical seat 46 defined by the body 20 and situated in the segment 42, i.e. in a position in which the shutter 26 shuts the hole 21 by bearing against the seat 46.

The shutter 26 has a shoulder 47 enabling the latch 27 to hold it in its open position. The shutter 26 also has a shoulder 26A.

The latch 27 is slidably mounted in a bore 48 so as to be movable along an axis Y-Y' perpendicular to the axis X-X', between two positions, in one of which it does not oppose movement of the shutter 26 between its open position and its shut position. In its other position, as shown in FIG. 2, and towards which it is urged by the spring 32 that is compressed in the bore 48, the latch 27 is suitable for holding the shutter 26 in its open position by forming an abutment for the shoulder 47.

Like a piston, a portion 49 of the latch 27 shuts the bore 48 in sealed manner, for which purpose it is provided with an O-ring 50. This portion 49 defines part of the variable-volume chamber 23, separating it from a portion $V_{48}$ of the volume of the bore 48, i.e. a portion that is put into communication with the outside via a hole 51 in the body 20 and via a hole 52 in the latch 27.

The passage 22 opens out into the hole 21 downstream from the seat 46, thereby connecting the hole to the variable-volume chamber 23.

The bleed passage 25 connects the variable-volume chamber 23 to the outside. It is pierced through the portion 20B of the body 20. The spring 33 is compressed between the valve members 29 and 30, urging each of them against a respective seat 53 or 54, i.e. towards a position in which the connection passage 22 or the bleed passage 25 is shut. The portion 20B defines the seat 54. The portion 20B can be screwed into the portion 20A to a greater or lesser depth so as to modify the distance between the seats 53 and 54, i.e. so as to adjust the extent to which the spring 33 is compressed. In other words, because its position is adjustable relative to the portion 20A, the portion 20B serves to calibrate, i.e. to set, the magnitude of the force exerted by the spring 33, in particular on the valve member 29. The valve member 29 is placed in such a manner that its open position is offset downstream relative to its position shutting the connection passage 22. The valve member 30 is placed in such a manner that its open position is offset upstream relative to its position shutting the bleed passage 25. The valve members 29 and 30 are both constituted by balls.

The valve member 28 is placed in the hole 21 upstream from the shutter 26 and in line therewith, so as to be movable along the axis X-X'. Its position shutting the hole 21 is offset downstream from its open position. The valve member 28 is urged by the spring 34 towards a seat 55 against which it bears while shutting the upstream segment 41 of the hole 21.

In FIG. 2, the protection device 6 allows hydrogen to pass therethrough at a pressure of about four bars. The hydrogen flows through the expanders 4 and 5 towards the cell 2, as represented by arrows $E_1$. By means of its shoulder 47, the latch 27 acts against the spring 31 to retain the shutter 26 blocked in its open position, in which position the shutter 26 does not shut the hole 21, but isolates in leaktight manner the segment 24 from the upstream segment 41 of the hole 21, i.e. the segment that the duct 40 puts into communication with the downstream segment 42 of the hole 21. With the shutter 26 in its open position, its finger 45 acts against the spring 34 to retain the valve member 28 in its open position, in which the valve member 28 is spaced apart from the seat 55 and does not shut the hole 21. Hydrogen from the expanders 4 and 5 flows along the upstream segment 41 of the hole 21, going round the valve member 28, and then round the shutter 26 and flowing along the duct 40, and finally flowing into the downstream segment 42 of the hole 21.

Still in FIG. 2, the spring 33 presses the valve member 29 against the seat 53, such that the connection passage 22 is shut and the variable-volume chamber 23 is isolated from pressure fluctuations that occur in the hole 21. As a result, the latch 27 remains stationary in spite of these pressure fluctuations and in spite of the fact that only the spring 32 is holding it in its position for retaining the shutter 26. Having the latch 27 stationary during normal operation of the equipment shown in FIG. 1 serves to avoid premature wear of the O-ring 50, and that is advantageous. This leads in particular to the operation of the protection device 6 being very reliable.

When the downstream segment 42 of the hole 21 is subjected to overpressure, e.g. because of a malfunction of at least one of the expanders 4 and 5, i.e. when it is subjected to a pressure $P_2$ greater than a predetermined threshold above which the cell 2 runs the risk of being damaged and at which the device is set by screwing the portion 20B into the portion 20A to a greater or lesser depth, the hydrogen present in the connection passage 22 pushes the valve member 29 towards its open position against the suitably rated spring 33, in which position the valve member 29 is spaced apart from the seat 53 and no longer shuts the connection passage 22. The passage 22 then puts the downstream portion of the hole 21 into communication with the variable-volume chamber 23 which is then brought to the overpressure $P_2$, like the hole 21. This overpressure $P_2$ exerts thrust on the portion 49 of the latch 27 against the spring 32 that is selected in such a manner that when the pressure in the chamber 23 exceeds the predetermined threshold it causes the latch 27 to slide away from its position for retaining the shutter 26.

Once the latch 27 has been slid away from its retaining position, the protection device 6 is as shown in FIG. 3, where the spring 31 pushes the shutter 26 towards its shut position, as represented by arrow $F_1$. In parallel, the spring 34 causes the valve member 28 to slide towards its shut position, as represented by arrow $F_2$. During the movement of the latch 27, the chamber 23 increases in volume by filling with hydrogen, with its flow from the hole 21 being represented by arrows $E_2$.

Figure 4:
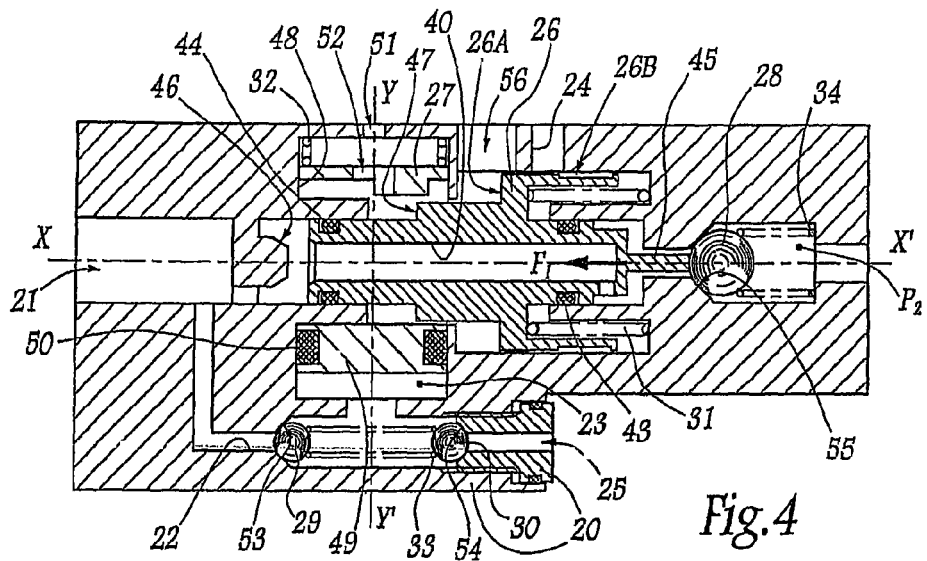

In FIG. 4, the shutter 26 is shown in the middle of sliding under the action of the spring 31. In other words, it is still not shutting the hole 21. The same does not apply to the valve member 28, which is already pressed against its seat 55 by the pressure $P_2$ upstream therefrom and by the spring 34. As a result, the downstream portion of the protection device 6 is isolated from the overpressure $P_2$ in the duct 7. Still in FIG. 4, the shutter 26 continues to isolate the segment 24 from the upstream segment 41 of the hole 21.

Figure 5:
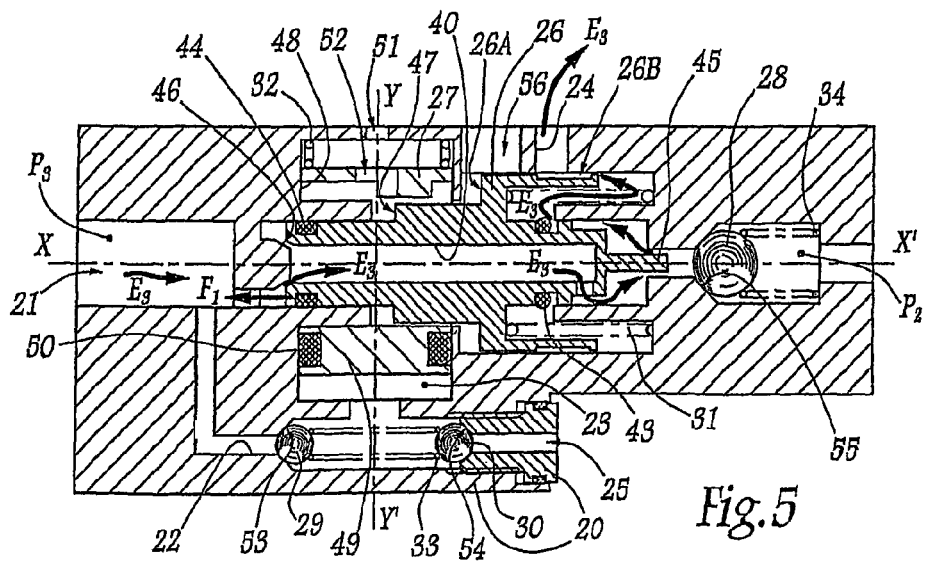

In FIG. 5, the sliding of the shutter 26 towards the seat 46 continues. Compared with the position of FIG. 4, the shutter 26 is nevertheless closer to its shut position. It no longer isolates the segment 24 from the duct 40, so the duct 40 and the portion of the hole 21 downstream from the valve member 28 are purged, in particular via said segment 24, as represented by arrows $E_3$. The pressure $P_3$ downstream from the valve member 28 therefore drops. It is less than the pressure $P_2$, so the pressure $P_2$ can no longer damage the cell 2, even if it continues to increase.

In FIG. 6, the spring 31 presses the shutter 26 against the seat 46. As a result, the shutter 26 shuts the downstream segment 42 of the hole 21, which segment is also shut by the valve member 28. In other words, there are two blocks between the duct 7 in which the overpressure $P_2$ exists and the cell 2, which cell is therefore very well protected, in compliance with the objects of the invention. The protection of the cell 2 is further improved by the fact that the intermediate segment 21A and the duct 40 communicate with the outside and are at atmospheric pressure $P_0$, even if the shutting performed by the valve member 28 is defective. In addition, in this device, the valve member 28 and the shutter 26 are both driven towards their respective seats as a result of the latch 27 sliding away from its retaining position due to an increase of the pressure in the chamber 23. Thus, the hole 21 is blocked twice as a result of trigger means that are common both to the valve member 28 and to the shutter 26. This increases the reactivity of the protection device in the event of overpressure.

Still with reference to FIG. 6, the variable-volume chamber 23 continues to be subjected to overpressure, i.e. to a pressure such that it prevents the spring 32 from moving the latch 27. Because of its position, and in particular because of the position of its shoulder 47 along the axis X-X', the shutter 26 also prevents the latch 27 from reaching its retaining position.

When the overpressure upstream from the valve member 28 disappears, the protection device cannot, on its own, return to a flow-passing position, since the springs 31 and 34 continue to hold the shutter 26 and the valve member 28 in their positions for shutting the hole 21. This also contributes to making the protection device safe, in compliance with the object of the invention.

In order to cause the protection device 6 to return to the position of FIG. 2, it is necessary for intervention by an authorized person. This person begins by sliding the shutter 26 upstream, as far as its open position, i.e. the position shown in FIG. 2. To do this, it is necessary to use a special tool O without which a non-authorized person cannot reset the device 6. The tool O shown in part in FIGS. 7 and 8 comprises a body c carrying an off-center drive finger d. The body c is circularly cylindrical in shape, and more precisely it is complementary in shape to the hole 56. Opposite from the finger d, it has a handle that is not shown.

After inserting the finger d in the hole 56 and then along the shoulder 26A, the authorized person turns the tool O about the axis V-V', which then coincides with the axis of the body c. The cylindrical wall of the hole 56 then guides the rotary movement of the tool O. During this movement, the finger d presses against the shoulder 26A and causes the shutter 26 to slide towards its open position, as represented by arrow $F_3$ in FIG. 7.

When it is far enough away from the seat 46, the shutter 26 acts via its finger 45 to move the valve member 28 towards its open position.

Once the shutter 26 is in its FIG. 2 position, it is necessary to purge the variable-volume chamber 23. To do this, the authorized person moves the valve member 30 away from the seat 54, e.g. by using a screwdriver T, so that a bleed flow represented by arrows $E_4$ in FIG. 8 can be established from said variable-volume chamber 23 towards the outside. At the end of purging, the pressure in the variable-volume chamber 23 is low enough to cease opposing the displacement $F_4$ of the latch 27 towards its retaining position under drive from the spring 32.

Once the latch 27 has returned into its FIG. 2 position, the tool O and the screwdriver T can be removed and the protection device 6 is again operational.

The device 6 presents a status indicator in that the shutter 26 is provided with an outer peripheral groove 26B that is painted in a color that is different from the color of the remainder of the shutter 26. Under drive from the spring 31, the groove 26B is brought into register with the segment 24, and the operator, located outside the body 20, can detect that the shutter 26 has moved together with the valve member 28 from their open positions as shown in FIG. 2 towards the positions of FIGS. 5 and 6, merely by viewing the groove 26B through the segment 24. In a variant, a colored ring could be mounted in the groove 26B, which would avoid the need for painting it.

The invention claimed is:

1. A protection device for protecting an apparatus against overpressure ($P_2$) in a fluid feeding apparatus, the protection device including a through hole for passing the fluid and a shutter movable between an open position and a closed position for shutting a first segment of the through hole, wherein the device also includes a shutter valve member movable between an open position and a closed position for shutting a second segment of the through hole, a trigger means for simultaneously triggering both drive of the shutter and drive of the valve member from their open positions towards their closed positions in response to overpressure ($P_2$) in the through hole, a bleed passage opening to an exterior of the device for purging at least an intermediate segment of the through hole when the valve member is in its closed position, but not when the valve member is in its open position, the intermediate segment being located downstream from the valve member, and wherein the shutter is downstream from the valve member and is adapted to open the bleed passage before reaching its closed position.

2. A protection device according to claim 1, wherein the trigger means includes a latch mounted slidably in a bore so as to be movable between a first position in which the latch retains the shutter in its open position, and a second position in which the latch does not oppose the shutter moving from its open position towards its closed position.

3. A protection device according to claim 2, including a resilient member for urging the latch towards its first position.

4. A protection device according to claim 2, wherein the shutter is a slidably-mounted slide, the latch and the shutter sliding respectively in a first direction (Y-Y') and in a second direction (X-X'), which directions intersect.

5. A protection device according to claim 2, wherein the latch separates first and second zones of the bore from each other, and is movable from its first position towards its second position as a function of the pressure that exists in the first zone that is connected to the hole by way of at least one connection passage.

6. A protection device according to claim 5, wherein the latch cannot be moved from its second position towards its first position until after the first zone of the bore has been purged.

7. A protection device according to claim 1, wherein, when the shutter is in its open position, but not when the shutter is in its closed position, the shutter retains the valve member in its open position.

8. A protection device according to claim 7, wherein the valve member is upstream from the shutter, which shutter is slidably mounted to pass from its closed position to its open position while moving towards the valve member and then while pushing the valve member towards its open position.

9. A protection device according to claim 1, including a connection passage connecting the hole with a chamber defined in part by a member forming part of the trigger means, the connection passage including a second shutter valve member and a resilient member for returning the second valve member upstream towards a position for shutting the connection passage, the resilient return member being calibrated in such a manner as to allow the second valve member to be driven by pressure ($P_2$) upstream from the second valve member when the pressure exceeds the pressure downstream from the second valve member by a predetermined quantity.

10. A protection device according to claim 9, wherein the chamber is leaktight, the protection device including means for purging said chamber.

11. A protection device according to claim 9, including means for calibrating the magnitude of the return force exerted by the resilient member on the second valve member.

12. A device according to claim 1, wherein it includes a state indicator making it possible from outside the body of the device to detect the positions of the shutter and of the valve member.

13. A protection device according to claim 1, wherein the protection device is fitted with one of two complementary male and female portions of a quick coupling so as to enable said hole to be coupled to the other portion of the coupling.

14. A subassembly for coupling a tank for storing hydrogen under pressure to a fuel cell of self-contained equipment for supplying electricity, with the subassembly forming part of the equipment, the subassembly comprising at least one expander for expanding hydrogen under pressure, and a protection device according to any preceding claim and placed downstream from the expander so as to be capable of protecting the fuel cell against overpressure ($P_2$) of the hydrogen reaching the fuel cell, wherein the protection device includes a through hole for passing the hydrogen and a shutter movable between an open position and a closed position for shutting a first segment of the through hole, wherein the device also includes a shutter valve member movable between an open position and a closed position for shutting a second segment of the through hole, together with trigger means for simultaneously triggering both drive of the shutter and drive of the valve member from their open positions towards their closed positions in response to overpressure ($P_2$) in the through hole, a bleed passage opening to an exterior of the device for purging at least an intermediate segment of the through hole when the valve member is in its closed position, but not when the valve member is in its open position, the intermediate segment being located downstream from the valve member.

* * * * *

UNITED STATES PATENT AND TRADEMARK OFFICE
CERTIFICATE OF CORRECTION

| | | |
|---|---|---|
| PATENT NO. | : 7,987,870 B2 | Page 1 of 1 |
| APPLICATION NO. | : 11/886314 | |
| DATED | : August 2, 2011 | |
| INVENTOR(S) | : Alain-Christophe Tiberghien | |

It is certified that error appears in the above-identified patent and that said Letters Patent is hereby corrected as shown below:

Cover Page:

Item (75), the first inventor's name should be corrected to read: Alain-Christophe Tiberghien rather than Tigerghien.

Signed and Sealed this

Thirteenth Day of September, 2011

David J. Kappos
*Director of the United States Patent and Trademark Office*